(12) United States Patent
Kawai

(10) Patent No.: US 11,634,230 B2
(45) Date of Patent: Apr. 25, 2023

(54) HYBRID FLIGHT VEHICLE USING ENGINE GYRO EFFECT FOR STABILIZATION

(71) Applicant: Honda Motor Co., Ltd., Tokyo (JP)

(72) Inventor: Keisuke Kawai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 774 days.

(21) Appl. No.: 16/660,576

(22) Filed: Oct. 22, 2019

(65) Prior Publication Data

US 2020/0148374 A1 May 14, 2020

(30) Foreign Application Priority Data

Nov. 8, 2018 (JP) .............................. JP2018-210802

(51) Int. Cl.
| | | |
|---|---|---|
| *B64C 17/06* | (2006.01) | |
| *B64D 27/14* | (2006.01) | |
| *B64D 27/24* | (2006.01) | |
| *B64C 29/00* | (2006.01) | |

(52) U.S. Cl.
CPC .............. *B64D 27/14* (2013.01); *B64C 17/06* (2013.01); *B64C 29/00* (2013.01); *B64D 27/24* (2013.01)

(58) Field of Classification Search
CPC .......... B64C 2201/024; B64C 2201/04; B64C 2201/042; B64C 2201/044; B64C 17/00; B64C 17/06; B64C 27/08; B64C 27/20; B64C 29/0091; B64D 27/14; B64D 27/26
See application file for complete search history.

(56) References Cited

U.S. PATENT DOCUMENTS

| | | | | |
|---|---|---|---|---|
| 7,520,466 B2* | 4/2009 | Bostan | ................... | B64C 27/20 244/12.3 |
| 7,857,254 B2* | 12/2010 | Parks | ..................... | B64C 15/00 244/12.4 |
| 8,708,274 B2* | 4/2014 | Lord | ...................... | F02C 6/206 244/55 |

(Continued)

FOREIGN PATENT DOCUMENTS

| | | |
|---|---|---|
| JP | H09242744 A | 9/1997 |
| JP | 2006290255 A | 10/2006 |
| JP | 2013174242 A | 9/2013 |

OTHER PUBLICATIONS

Japanese Office action; Application 2018-210802; dated Dec. 7, 2021.

*Primary Examiner* — Richard Green
*Assistant Examiner* — Michael A. Fabula
(74) *Attorney, Agent, or Firm* — Duft & Bornsen, PC

(57) ABSTRACT

In a hybrid flight vehicle, having four rotors attached to a frame and configured to produce propelling force to propel the frame, a gas turbine engine attached to the frame and configured to rotate when fuel is supplied, a generator connected to an output shaft of the engine and configured to generate electric power when driven by the engine, a battery configured to store the electrical power generated by the generator, and four first electric motors each connected to the rotors to drive associated one of the rotors when the electric power is supplied from the battery, and an electronic control unit configured to control flight by regulating driving of the four rotors by the first electric motors. In the vehicle, the output shaft of the engine is attached parallel to at least one among yaw axis, pitch axis and roll axis of the frame.

13 Claims, 16 Drawing Sheets

(56) References Cited

U.S. PATENT DOCUMENTS

| | | | |
|---|---|---|---|
| 10,926,874 B2* | 2/2021 | Giannini | B64D 29/02 |
| 2006/0231675 A1* | 10/2006 | Bostan | B64C 27/20 |
| | | | 244/12.1 |
| 2013/0062455 A1* | 3/2013 | Lugg | B64C 29/0025 |
| | | | 244/12.3 |
| 2013/0062463 A1* | 3/2013 | Lord | B64D 35/06 |
| | | | 244/55 |
| 2017/0158321 A1* | 6/2017 | Mia | B64C 29/005 |
| 2019/0023390 A1* | 1/2019 | Murrow | B64D 31/06 |
| 2019/0061924 A1* | 2/2019 | Kita | F16H 57/082 |
| 2019/0061932 A1* | 2/2019 | Kita | B64D 27/02 |
| 2019/0118943 A1* | 4/2019 | Machin | B64C 27/473 |
| 2020/0039657 A1* | 2/2020 | Ransom | F02K 3/04 |
| 2020/0148376 A1* | 5/2020 | Kawai | B64D 27/10 |
| 2020/0156801 A1* | 5/2020 | Tamada | B64D 27/10 |

* cited by examiner

HYBRID FLIGHT VEHICLE USING ENGINE GYRO EFFECT FOR STABILIZATION

CROSS-REFERENCE TO RELATED APPLICATION

This application is based upon and claims the benefit of priority from Japanese Patent Application No. 2018-210802 filed on Nov. 8, 2018, the contents of which are incorporated herein by reference.

BACKGROUND OF THE INVENTION

Field of the Invention

This invention relates to a hybrid flight vehicle and more particularly to a hybrid flight vehicle capable of vertical take-off and landing (VTOL) that is equipped with multiple rotors driven by power generated by a generator driven by a gas turbine engine.

In the case of a hybrid flight vehicle capable of vertical take-off and landing as referred to above, any disparity of thrust arising among the multiple rotors during take-off results in sudden horizontal frame movement that is apt to abruptly change frame posture at instant of leaving the ground.

For overcoming this, Japanese Unexamined Patent Application 2006-290255 teaches technology aimed at stabilizing frame posture by gimbaling four take-off and landing thrust engines to be rotatable in only one direction and connecting paired thrust engines by mechanical link mechanisms, thereby enabling effective use of thrust engine gyro effect.

Although the reference adopts the aforesaid configuration in order to stabilize posture immediately after take-off, it goes no further than this and proposes nothing whatsoever regarding posture stabilization during flight.

SUMMARY OF THE INVENTION

Therefore, as regards a vertical take-off and landing capable hybrid flight vehicle equipped with rotors driven by electric power generated by a gas turbine engine, this invention has as an object to resolve the aforesaid disadvantages by providing a hybrid flight vehicle adapted to use engine gyro effect to effectively stabilize in-flight posture.

In order to achieve the object, this invention provides a hybrid flight vehicle, comprising: a frame; multiple rotors attached to the frame and configured to produce propelling force to propel the frame; a gas turbine engine attached to the frame and configured to be driven when fuel is supplied; a generator connected to an output shaft of the gas turbine engine and configured to generate electric power when driven by the gas turbine engine; a battery configured to store the electrical power generated by the generator; multiple first electric motors each connected to the rotors to drive associated one of the rotors when the electric power is supplied from the battery; and a control unit configured to control flight by regulating driving of the multiple rotors by the first electric motors; wherein the output shaft of the gas turbine engine is attached parallel to at least one among yaw axis, pitch axis and roll axis of the frame.

BRIEF DESCRIPTION OF THE DRAWINGS

The objects and advantages of the present invention will become clearer from the following description of embodiments in relation to the attached drawings, in which.

DETAILED DESCRIPTION OF THE INVENTION

In the following, the hybrid flight vehicle according to this invention is explained with reference to the attached drawings in the following.

First Embodiment

Figure 1:
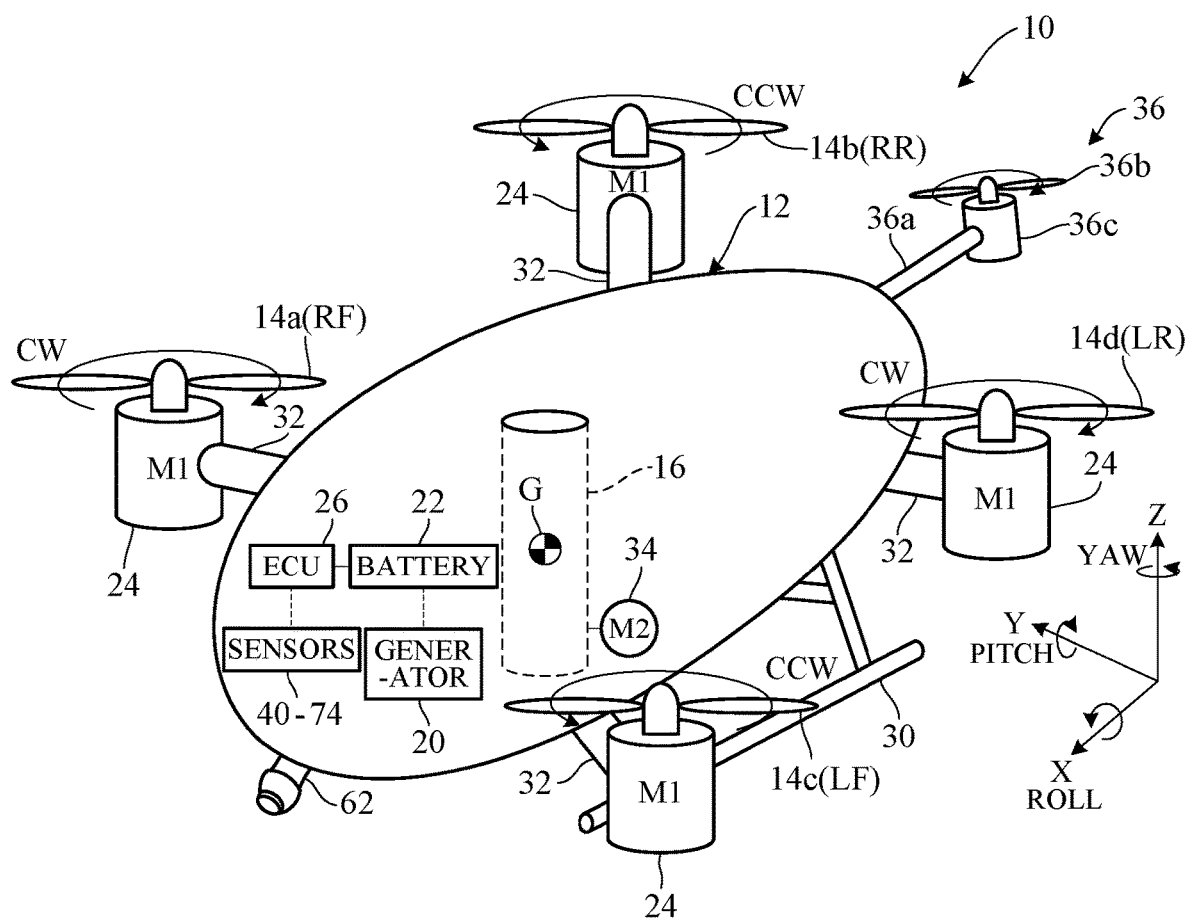
FIG. 1 is a perspective diagram showing an overview of a hybrid flight vehicle in accordance with a first embodiment of this invention.
Figure 2:
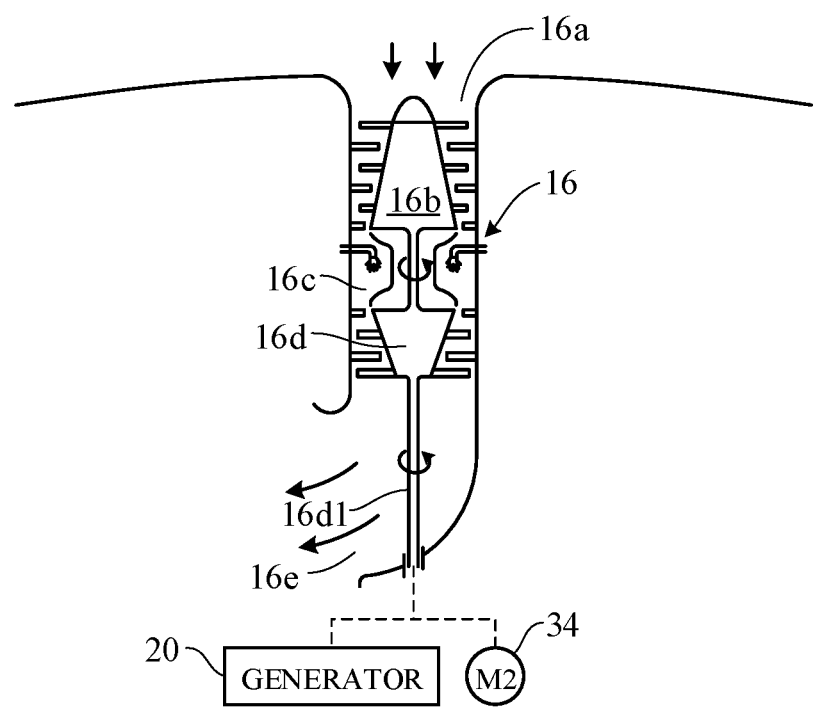
FIG. 2 is a partial side view of the hybrid flight vehicle of FIG. 1.
Figure 3:
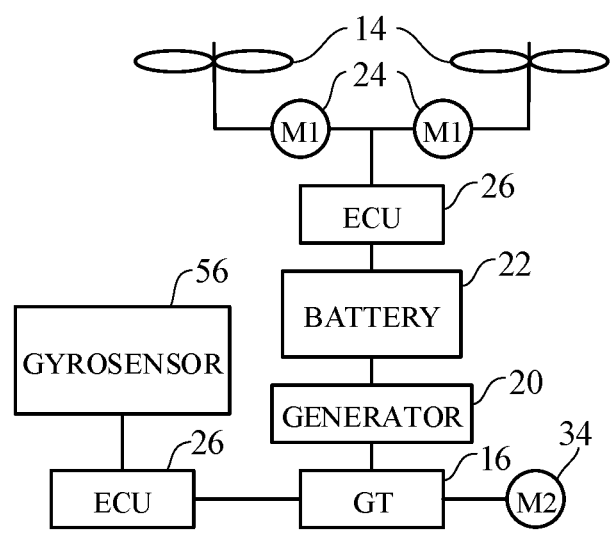
FIG. 3 is a block diagram illustrating an overall interconnection of constituent elements of the hybrid flight vehicle of FIG. 1.

FIG. 1 is a perspective diagram showing an overview of a hybrid flight vehicle according to a first embodiment of this invention. FIG. 2 is a partial side view of the hybrid flight vehicle of FIG. 1. And FIG. 3 is a block diagram illustrating overall constituent elements of the hybrid flight vehicle of FIG. 1.

Reference numeral 10 in FIG. 1 and other drawings designates a hybrid flight vehicle (hereinafter called simply "flight vehicle" or "vehicle"). The flight vehicle 10 is given a configuration enabling Vertical Take-Off and Landing, that comprises a frame (fuselage) 12, multiple rotors 14 attached to the frame and configured to produce propelling force to propel the frame 12 (flight vehicle 10), a gas turbine engine (GT) 16 attached to the frame 12 and configured to drive the rotors 14, a generator 20 connected to an output shaft of the GT 16 and configured to generate electric power, a battery 22 configured to store electrical energy generated by the generator 20, a group of first electric motors 24 (hereinafter sometimes called simply "motors" and designated "M1" in the drawings) capable of driving the rotors 14 using power supplied from the battery 22, and a control unit 26 (electronic control unit, hereinafter called "ECU") configured to control flight by regulating driving of the multiple rotors 14 by the electric motors 24. Landing gear 30 is attached to bottom of the frame 12.

The GT 16 and other members are housed inside the frame 12. Although the flight vehicle 10 is not built to carry a passenger, it can be modified to a manned type vehicle by installing a passenger seat on the frame 12.

The multiple rotors (fans, propellers) 14 include 2n (n≥2) rotor units attached through attachment shafts 32 in a radial pattern in top view of the frame 12, actually 4 units comprising a right front (RF) unit 14a, a right rear (RR) unit 14b, a left front (LF) unit 14c and a left rear LR unit 14d. The aforesaid motors (M1) 24 are each installed at bases of the associated four rotors 14.

Each rotor 14 has a rotational axis lying parallel to yaw axis (Z axis; gravity axis) and is configured as a single-blade fixed pitch propeller of known shape. The number (n) of rotors 14 of the flight vehicle 10 is not limited to n=2 (quadcopter) but can instead be n=3 (hexacopter), n=4 (octacopter), or the like.

The four rotors 14 are adapted to maintain horizontal posture (attitude) of the flight vehicle 10 by, for example, rotating one set of rotors 14a and 14d in one direction, e.g., clockwise (CW), and rotating another set of rotors 14b and 14c in opposite (counterclockwise (CCW)) direction.

The GT 16 is a conventional turboshaft engine, like that shown in FIG. 2, having a single-spool structure comprising a compressor 16b including fan rotor blades and stator blades for compressing therebetween intake air sucked in through an air intake port 16a opened in the frame 12, a combustion chamber 16c installed downstream thereof, and a turbine 16d connected to the compressor 16b to rotate integrally therewith. Illustration of a frame 12 side opening of a compressed intake air exhaust port 16e is omitted in FIGS. 1 and 2.

An output shaft (turbine output shaft, i.e., GT 16 output shaft) 16d1 of the turbine 16d is connected to the generator 20 through an appropriate speed reducer mechanism (not shown) in order to drive the generator 18. The generator 20 driven by the turbine 16d generates electric power (AC power). Power generated by the generator 20 is converted to DC power by a converter of a PDU (Power Drive Unit; not shown) and stored in the battery 22.

The turbine output shaft 16d1 is also connected to a second electric motor 34 (designated "M2" in the drawings) connected to the output shaft 16d1 of the GT 16 and configured to drive the GT 16 using power supplied from the battery 22, in a configuration whereby the GT 16 is rotated (motored (idled)) by the second motor 34 when fuel supply is terminated. As illustrated, the output shaft of the GT 16 (the turbine output shaft 16d1) is attached to lie parallel to yaw axis (Z axis) of the frame 12.

The battery 22 is connected to the electric motors 24. Specifically, power discharged from the battery 22 and converted to AC through the PDU inverter is supplied as AC power to the four electric motors 24 installed one on each of the four rotors 14. The motors 24 are brushless DC motors rotated by sequentially supplying current to their three phase coils (not shown). Like the motors 24, the second motor 34 is also a brushless DC motor.

In the flight vehicle 10 according to the present embodiment, the GT 16 has rated power of about 100 kW, the motors 24 of about 20 kW, and the battery 22 of about 10 kW. The battery 22 incorporates a BMS (Battery Management System) 22a for self-diagnosing residual (State of Charge: SOC).

As illustrated in FIG. 1, an auxiliary rotor 36 is attached to the rear of the frame 12 through attachment shaft 36a as a disturbance generator. The auxiliary rotor 36 comprises a single-blade fixed pitch propeller 36b (whose blade is shorter than that of the rotors 14) and an electric motor 36c configured to rotate the propeller 36b. The auxiliary rotor 36 has a rotational axis lying parallel to yaw-axis (Z axis). The auxiliary rotor 36 is installed at a location a predetermined distance apart from (rear of) the frame 12 in roll axis (X axis) direction from center of gravity G of the frame 12. Here, the predetermined distance means a distance that is sufficient to generate disturbance in the frame 12.

Figure 4:
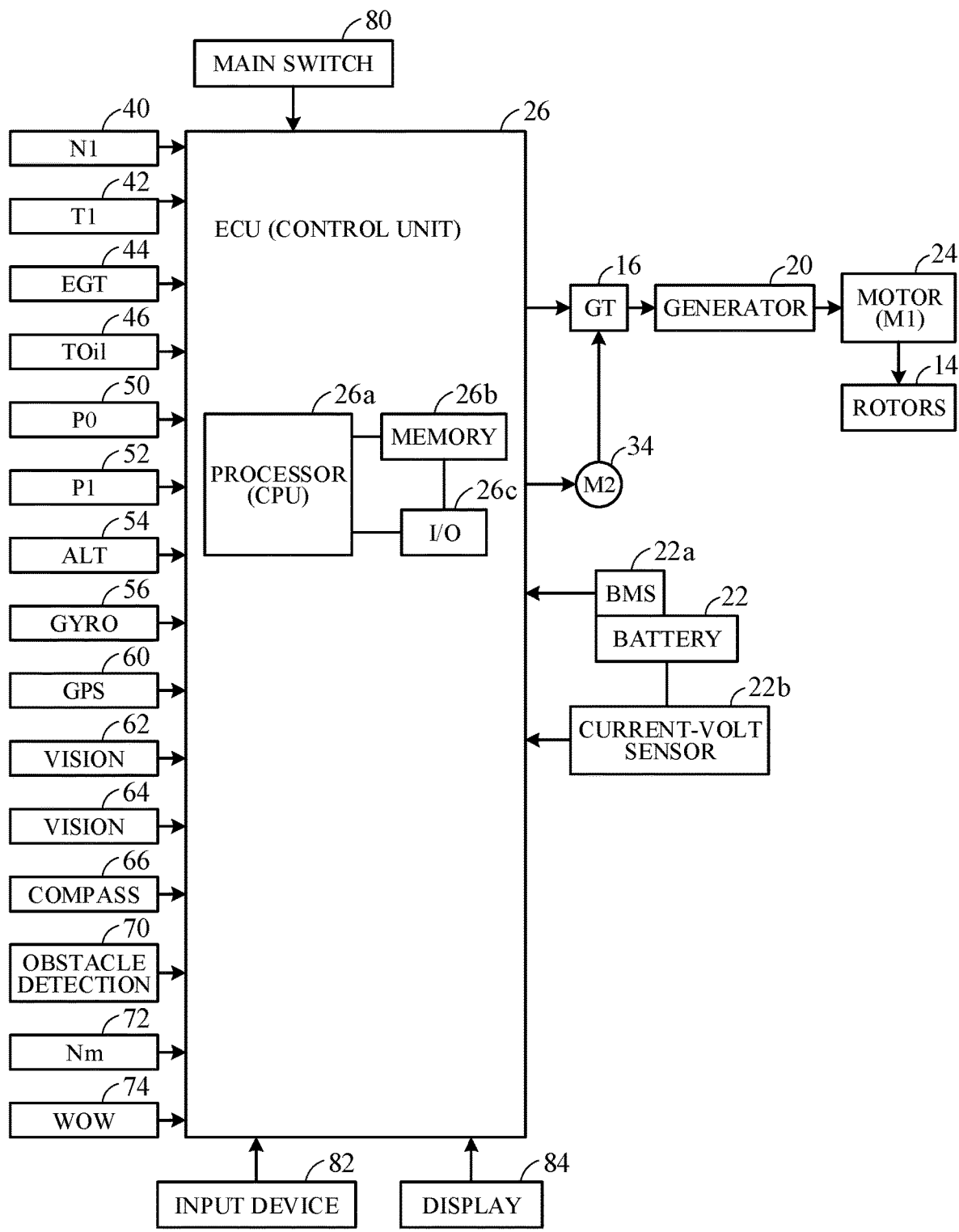
FIG. 4 is a block diagram focused on a control unit shown in FIG. 3 (and other figures) and various sensors.

FIG. 4 is a block diagram focused on the ECU (control unit) 26 shown in FIG. 3 (and other figures) and various sensors.

As shown in FIG. 4, the ECU 26 is a microcomputer comprising at least one processor (CPU) 26a, at least one memory 26b (more specifically memories including ROM and RAM) coupled to the processor 26a, and an I/O unit 26c, and is installed at a suitable location as accommodated in a container.

Turning to an explanation of the various sensors, a rotational speed sensor 40 installed near the turbine output shaft 16d1 of the GT 16 outputs a signal indicating turbine rotational speed N1. A temperature sensor 42 installed near the air intake port 16a formed in the frame 12 outputs a signal indicating GT inlet temperature T1, and a second temperature sensor 44 (engine temperature detector) installed at a suitable location downstream of the combustion chamber 16c outputs a signal indicating engine temperature (exhaust gas temperature) EGT. A third temperature sensor 46 (lubricant temperature detector) installed at a suitable part of a lubricating oil supply system (not shown) outputs a signal indicating lubricant temperature Toil.

Further, a pressure sensor 50 installed inside the container housing the ECU 26 outputs a signal indicating atmospheric pressure P0 and a second pressure sensor 52 installed near the air intake port 16a outputs a signal indicating GT inlet pressure P1.

Further, an altimeter (ALT) 54 installed on underside of the frame 12 produces an output indicating altitude ALT of the flight vehicle 10 using a reflected wave of a downwardly projected laser beam or the like, and a gyrosensor (GYRO) 56 installed at an appropriate location on the frame 12 produces an output indicating angle of inclination of the frame 12 relative to Z axis (yaw axis) among absolute X, Y, Z coordinate axes (shown in FIG. 1).

Moreover, a GPS receiver 60 provided at a suitable location on the frame 12 uses signals received from a group of satellites to produce an output indicating position of the flight vehicle 10. Further, a single first vision sensor (VISION) 62 attached under the frame 12 to face downwards as shown in FIG. 1 outputs forward-looking captured images, and multiple second vision sensors (VISION) 64 attached at rear and sides of the frame 12 output rearward- and sideward-looking captured images. In addition, a compass 66 provided at a suitable location on the frame 12 produces an output indicating absolute direction, and an obstacle detection sensor (OBSTACLE DETECTION) 70 is installed that uses a reflected wave of a forward projected ultrasonic signal to produce an output indicating presence/absence of an obstacle.

Further, four rotational speed sensors 72 installed one near the rotating shaft of each of the first motors 22 installed at the four rotors 14 produce outputs indicating motor rotational speeds Nm. Moreover, as pointed out earlier, the BMS 22a of the battery 22 (battery residual detector) produces an output indicating residual (SOC), and a current-volt sensor 22b (battery failure detector) installed between the battery 22 and the PDU produces an output indicating amperage and voltage of power inputted to the battery 22. In addition, a WOW (Weight-on-Wheel) sensor 74 provided on the landing gear 28 produces an output indicating landing (touchdown) when the frame 12 lands.

A main switch 80 is provided at an appropriate location on the frame 12. When an operator (user) turns the main switch 80 ON, the GT 16 is started and the CPU 26a of the ECU 26 is activated by operating power supplied from the battery 22. In addition, input device 82 and a display 84 are connected to the ECU 26.

Outputs of the aforesaid sensors are sent to the ECU 26. The ECU 26 uses these outputs to ascertain operating state of the GT 16, to control operation of the GT 16 by, inter alia, metering supply of fuel to the combustion chamber 16c so as to increase and decrease turbine rotational speed, to ascertain operating state of the battery 22, and to control flight of the flight vehicle 10 by regulating driving of the rotors 14 by the motors 22. Moreover, the ECU 26 ascertains flight speed of the flight vehicle 10 from time-course change of output of the GPS receiver 60.

Figure 5:
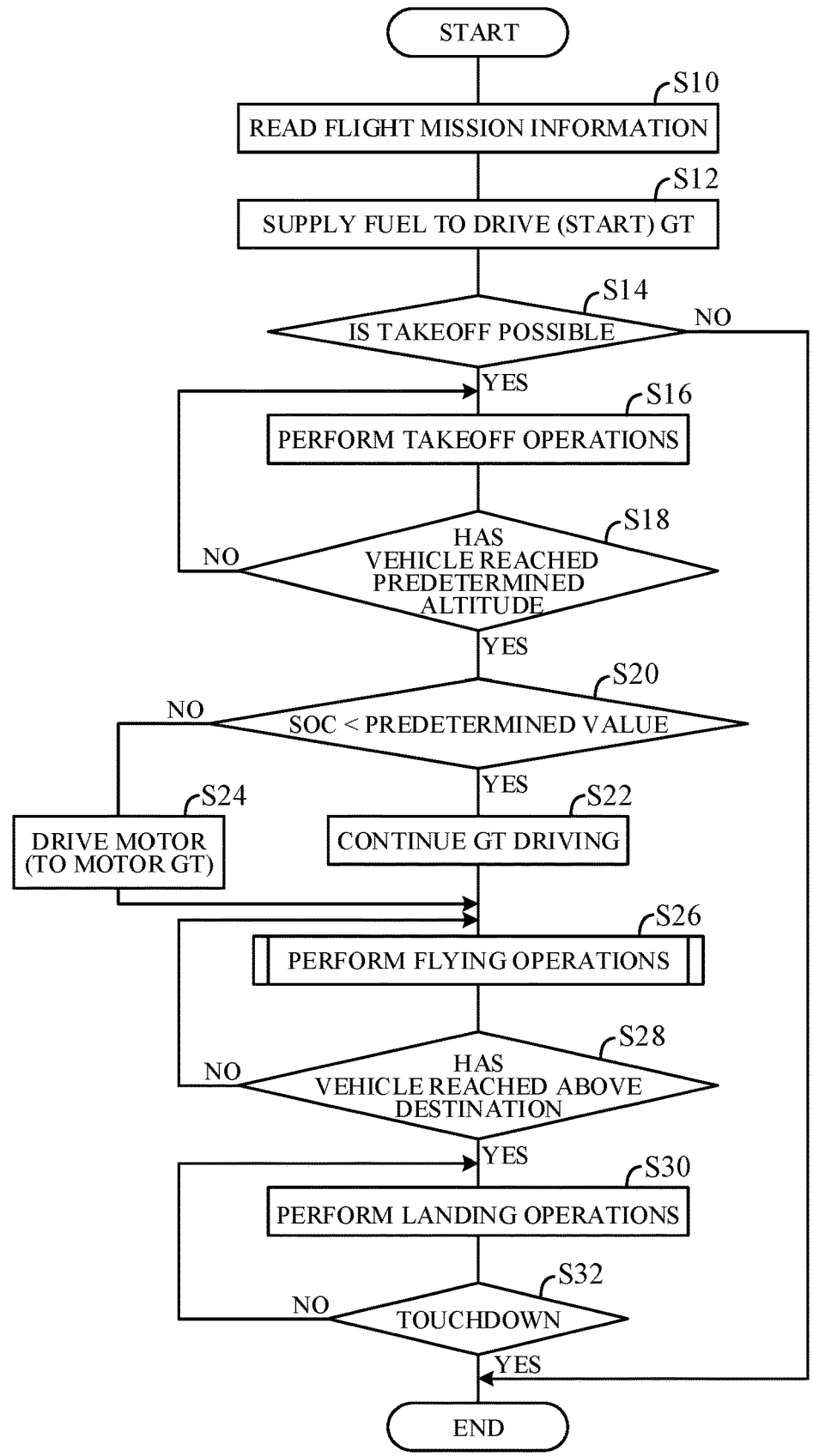
FIG. 5 is a flowchart showing processing of the control unit of FIG. 3.

FIG. 5 is a flowchart showing processing of the ECU 26, namely, operations of the flight vehicle 10 according to this embodiment.

Starting with an explanation with reference to FIG. 5, first, in S10 (S: processing Step), destination, flight course and other flight mission information inputted (instructed) by an operator through the input device 82 and display 84 is read, whereafter in S12 fuel is supplied to drive (start) the GT 16.

Next, the program goes to S14, in which it is determined whether takeoff is possible, and when the result is NO, the ensuing processing is skipped, and when YES, the program goes to S16, in which takeoff operations are performed.

During takeoff, the rotors 14 are rotated by rotation transmitted from the motor 24, and rotational speed of the four rotors 14 is controlled to increase evenly.

The program next goes to S18, in which it is determined based on output of the altimeter 54 whether the flight vehicle 10 has reached predetermined altitude, i.e., whether takeoff was achieved, and when the result is NO, the program returns to S16, and when YES, goes to S20, in which it is determined whether residual (SOC) of the battery 22 detected from the BMS 22a is equal to or greater than a predetermined value. This predetermined value is defined as, for example, one equivalent, or nearly equivalent, to fully charged state of the battery 22.

When the result in S20 is YES, the program goes to S22, in which driving of the GT 16 (i.e., fuel supply to the GT 16) is continued. On the other hand, when NO, the program goes to S24, in which the second motor 34 is driven to rotate (motor) the GT 16.

Figure 6:
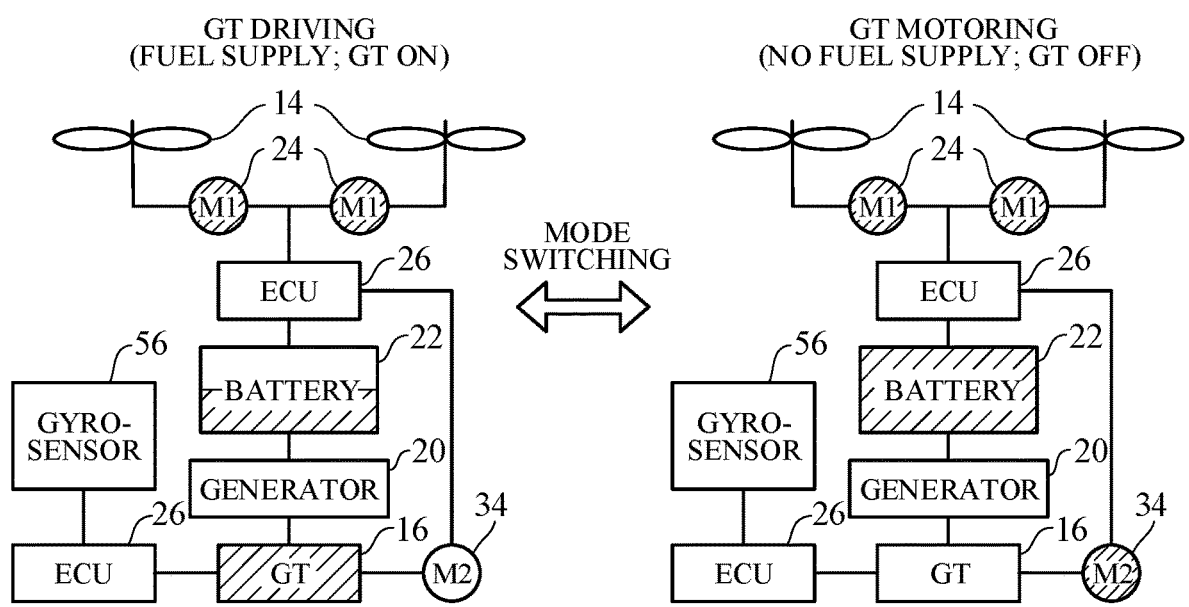
FIG. 6 is a block diagram, similar to FIG. 3, but showing processing performed in the flowchart of FIG. 5.

FIG. 6 is a block diagram, similar to FIG. 3, but showing processing performed in S20 to S24. In FIG. 6 (and other figures), only two of the four rotors 14 and motors 24 are illustrated. In the figures, hatching of the battery 22 indicates, by size thereof, degree of residual (SOC), and hatching of other elements indicates their being in operation.

As described in the above, when residual (SOC) of the battery 22 is equal to or greater than the predetermined value, fuel supply to the GT 16 is stopped and the second motor 34 is driven to rotate (motor) the GT 16. Thus, when charging of the battery 22 is not possible, the rotation of the GT 16 can still be continued. With this, it becomes possible to improve the stability of flight vehicle 10 due to gyro effect of the GT 16 as will be mentioned later.

The program next goes to S26, in which flying operations are performed, i.e., the frame 12 (specifically, the flight vehicle 10) is flown.

While flying toward the inputted destination, posture of the frame 12 is finely adjusted based on output of the gyrosensor 56. For example, flight direction is controlled by reducing rotational speed of the two forward rotors 14a and 14c among the four rotors 14 and increasing rotational speed the two rearward rotors 14b and 14d.

When turning, to the right for example, is to be performed, rotational speed of the two right side rotors 14a and 14b among the four rotors 14 is reduced and rotational speed of the two left side rotors 14c and 14d is increased, whereby the frame 12 is turned in desired right direction by reaction force of the rotors 14 on the side of higher rotational speed. Degree of turning is adjusted by increasing/decreasing rotational speed of the rotors 14.

In rotation control (control of rotation around yaw axis), CCW rotation of the frame 12 is performed by increasing rotational speed of the CW rotating rotors 14a and 14d among the rotors 14 and lowering rotational speed CCW rotating rotors 14b and 14c. CW rotation of the frame 12 is performed in reverse from the aforesaid.

The program next goes to S22, in which it is determined from output of the GPS receiver 60 whether a point above the destination has been reached, and when the result is NO, the program returns to S20, and when YES, goes to S24, in which landing operations are performed, i.e., the frame 12 (flight vehicle 10) goes into landing mode.

The frame 12 is landed by gradually decreasing rotational speed of all of the four rotors 14. This processing is continued until touchdown is determined from output of the WOW sensor 74 in S26.

Figure 7:
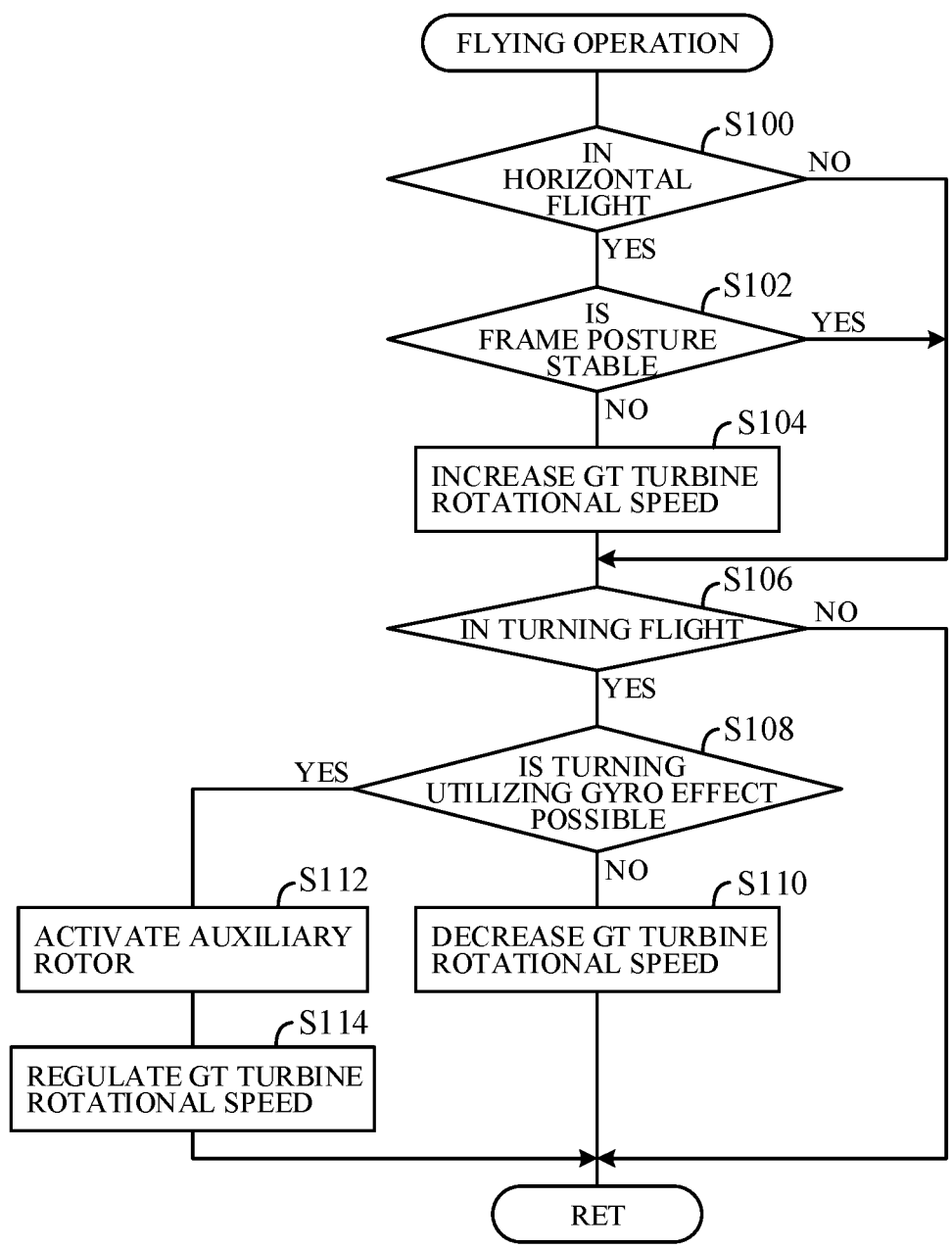
FIG. 7 is a subroutine flowchart detailing the flight control processing performed in the flowchart of FIG. 5.

FIG. 7 is a subroutine flowchart detailing the flight control processing of FIG. 5.

Now to explain, it is determined in S100 whether the flight vehicle 10 is in horizontal flight. This is determined from the flight mission read in S10.

When the result in S100 is YES, the program goes to S102, in which it is determined from output of the gyrosensor 56 whether posture of the frame 12 is stable, and when the result is NO, goes to S104, in which turbine rotational speed N1 of the GT 16 is increased (raised) in order to use gyro effect of the GT 16 to help stabilize posture of the frame 12.

Figure 8A:
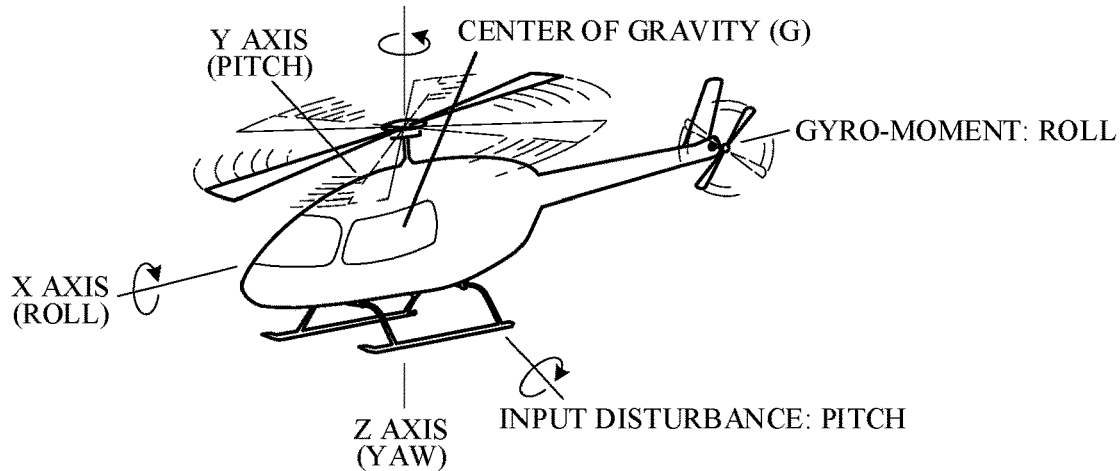
FIGS. 8A to 8C are a set of explanatory diagrams directed to explaining gyro effect in correspondence to attached (disposed) position of a gas turbine engine on a helicopter.
Figure 8B:
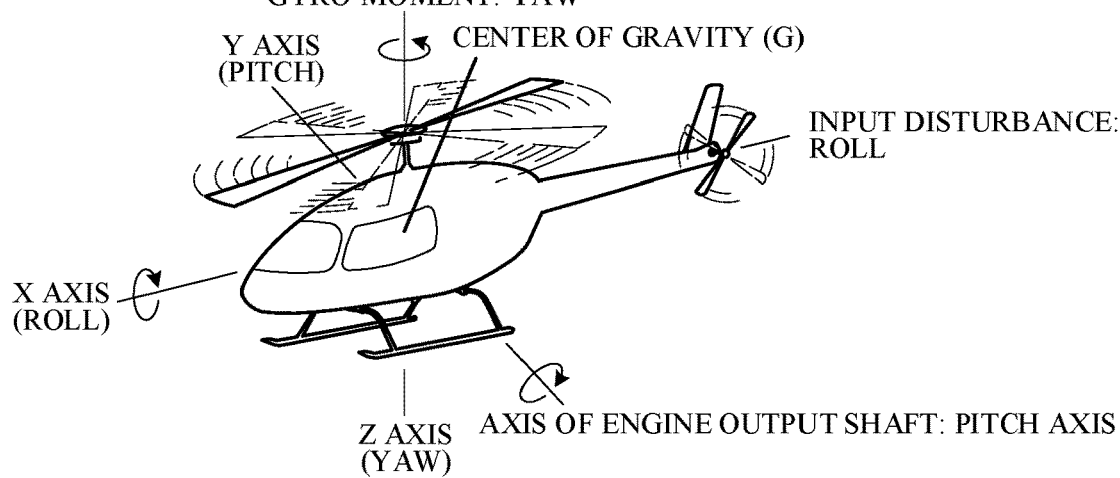
Figure 8C:
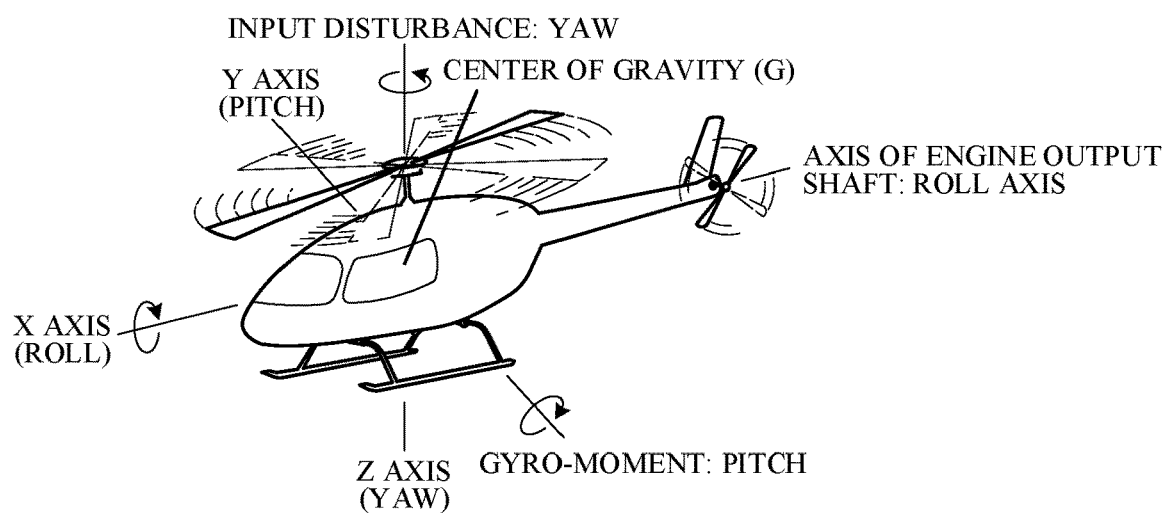
Figure 9:
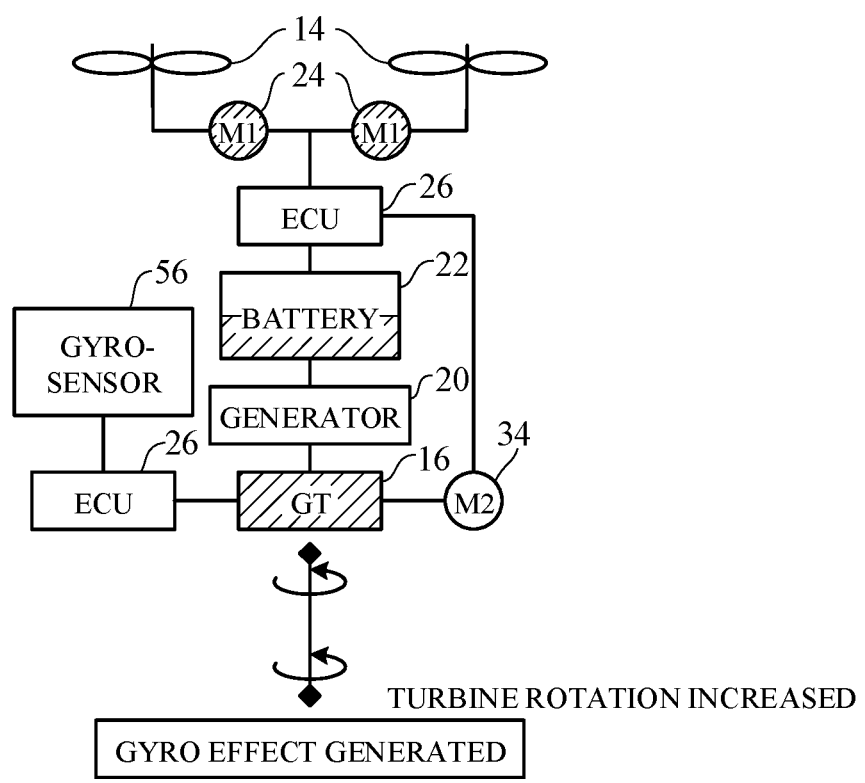
FIG. 9 is a block diagram, similar to FIG. 3, but showing the processing performed in the flowchart of FIG. 7.

As drawings for elucidating this point, FIGS. 8A to 8C are directed to explaining gyro effect in correspondence to attached (disposed) position of the GT 16 on a helicopter, and FIG. 9 is a block diagram similar to FIG. 3 showing the control performed in S102 and S104.

Gyro effect refers generally to phenomenon of postural stability of a spinning body being difficult to destabilize, but in case of the GT 16 being attached to (mounted on) the flight vehicle 10, gyro effect differs depending on attached position.

In this embodiment, similar to the example illustrated in FIG. 8A, the turbine output shaft (GT output shaft) 16d1 of the GT 16 is attached parallel to yaw axis (Z axis) of the frame 12, so that not only horizontal stability (stability during horizontal flight of the flight vehicle) is increased but horizontal stability can also be further enhanced by increasing (raising) turbine rotational speed N1.

Moreover, in such case, when input disturbance is torque around pitch axis, gyro-moment develops around roll axis. In this context, gyro-moment is moment first occurring upon input of disturbance and, concretely speaking, means moment acting on a swaying body perpendicular to both rotation axis and sway axis.

Turning performance of the frame 12 can therefore be enhanced by deliberately producing gyro-moment so as to generate moment around roll axis. When the attachment position is as shown in FIG. 8A, however, weakness to disturbance around yaw axis is a drawback.

Moreover, in case of the GT 16 being attached parallel to pitch axis (Y axis) of the frame 12 as shown in FIG. 8B, when input disturbance is torque around roll axis, gyro-moment develops around yaw axis, thus enabling improvement of frame 12 turning performance. When the attachment position is as shown in FIG. 8B, however, weakness to disturbance around pitch axis is a drawback.

Moreover, in case of the GT 16 being attached parallel to roll axis (X axis) of the frame 12 as shown in FIG. 8C, when input disturbance is torque around yaw axis, gyro-moment develops around pitch axis, thus enabling improvement of frame 12 turning performance. When the attachment position is as shown in FIG. 8C, however, weakness to disturbance around roll axis is a drawback.

Returning to explanation of the flowchart of FIG. 7, the program next proceeds to S106, in which it is determined from the flight mission read in S10 whether the flight vehicle 10 is in turning flight. The same applies when the result in S100 is NO or the result in S102 is YES.

When the result in S106 is YES, the program goes to S108, in which it is determined whether turning utilizing gyro effect is possible, and when the result is NO, goes to S110, in which turbine rotational speed N1 of the GT 16 is decreased (lowered) in order to decrease gyro effect of the GT 16 and thereby help stabilize posture during turning of the frame 12.

In other words, in light of the fact that attachment of the turbine output shaft 16d1 of the GT 16 parallel to yaw axis of the frame 12 in the aforesaid manner increases horizontal stability, which is more harmful than helpful during turning of the flight vehicle 10, rotational speed N1 is decreased (lowered) in order to diminish horizontal stability and thereby achieve better postural stability during turning than when rotational speed N1 is high.

Figure 10:
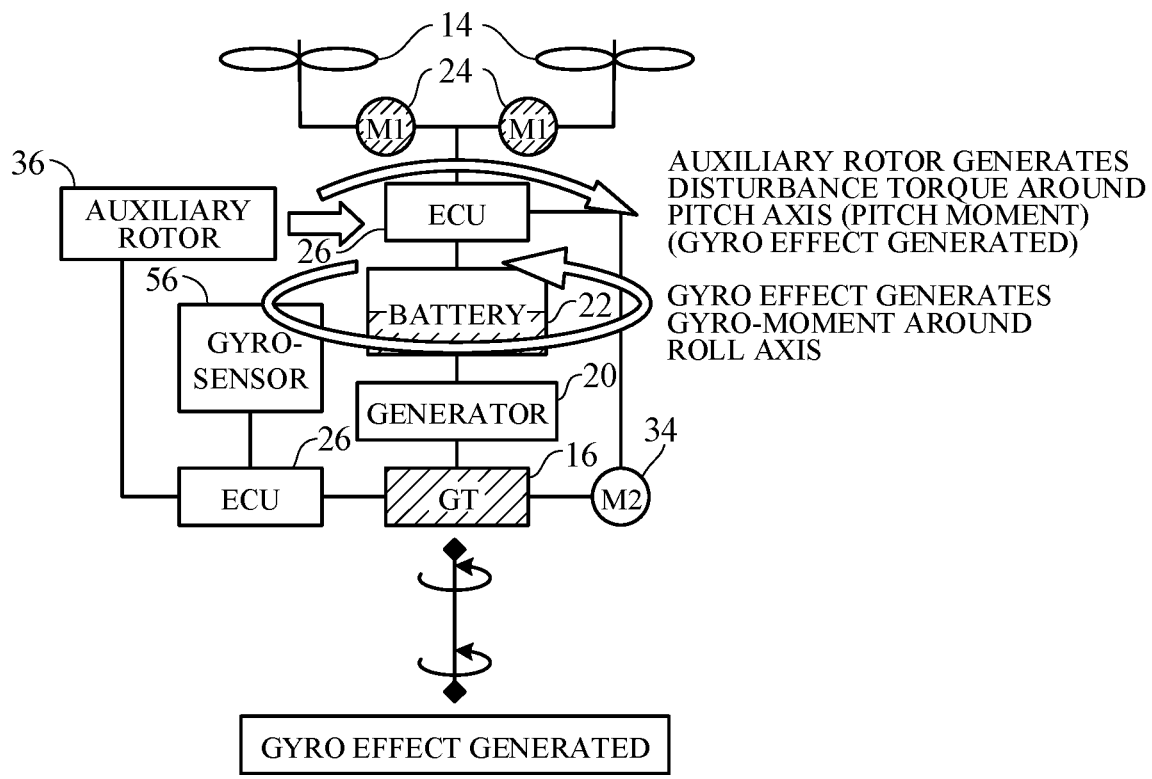
FIG. 10 is a block diagram, similar to FIG. 3, but showing the processing performed in the flowchart of FIG. 7.

On the other hand, when the result in S108 is YES, i.e., when turning utilizing gyro effect is determined to be possible, the program goes to S112, in which the auxiliary rotor 36 is activated. FIG. 10 is a block diagram similar to FIG. 3, but showing processing at this time. Next, the program proceeds to S114, in which turbine rotational speed N1 is regulated in order to regulate gyro effect.

In this case, since the auxiliary rotor 36 gives rise to disturbance torque around pitch axis (Y axis), effective turning action is enabled by the resultant of such torque and gyro-moment around roll axis.

Figure 11:
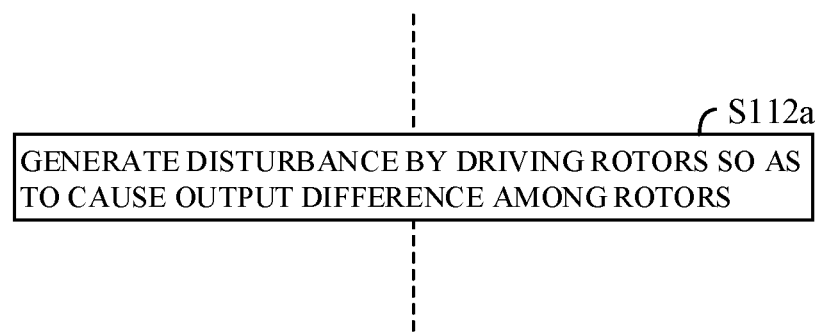
FIG. 11 is a partial flowchart showing modification of the processing performed in the flowchart of FIG. 7.
Figure 12:
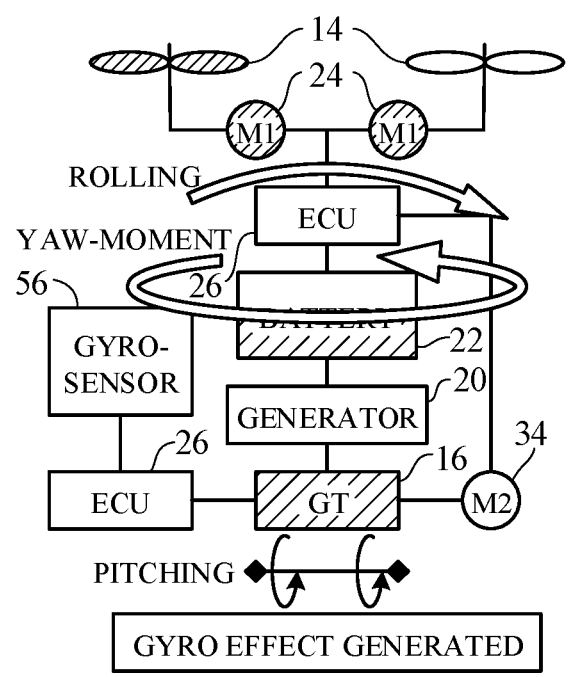
FIG. 12 is a block diagram, similar to FIG. 3, but showing the processing performed in the flowchart of FIG. 7.

Alternatively, the processing of S112 can be modified to generate disturbance by driving the rotors 14, as indicated by S112a in FIG. 11. Specifically, disturbance can be generated by controlling driving of the four rotors 14 so as to cause output difference (thrust difference) among the four rotors 14. FIG. 12 is a block diagram similar to FIG. 3, but showing this processing.

Returning to the flowchart of FIG. 5, the program next goes to S28, in which it is determined from output of the GPS receiver 60 whether a point above the destination has been reached, and when the result is NO, the program returns to S26, and when YES, goes to S30, in which the frame 12 (flight vehicle 10) goes into landing mode.

The frame 12 is landed by gradually decreasing rotational speed of all of the four rotors 14. This processing is continued until touchdown is determined from output of the WOW sensor 74 in S32.

Owing to the aforesaid configuration, this embodiment can utilize gyro effect of the GT 16 or gyro-moment to effectively stabilize posture during flight.

Second Embodiment

Figure 13:
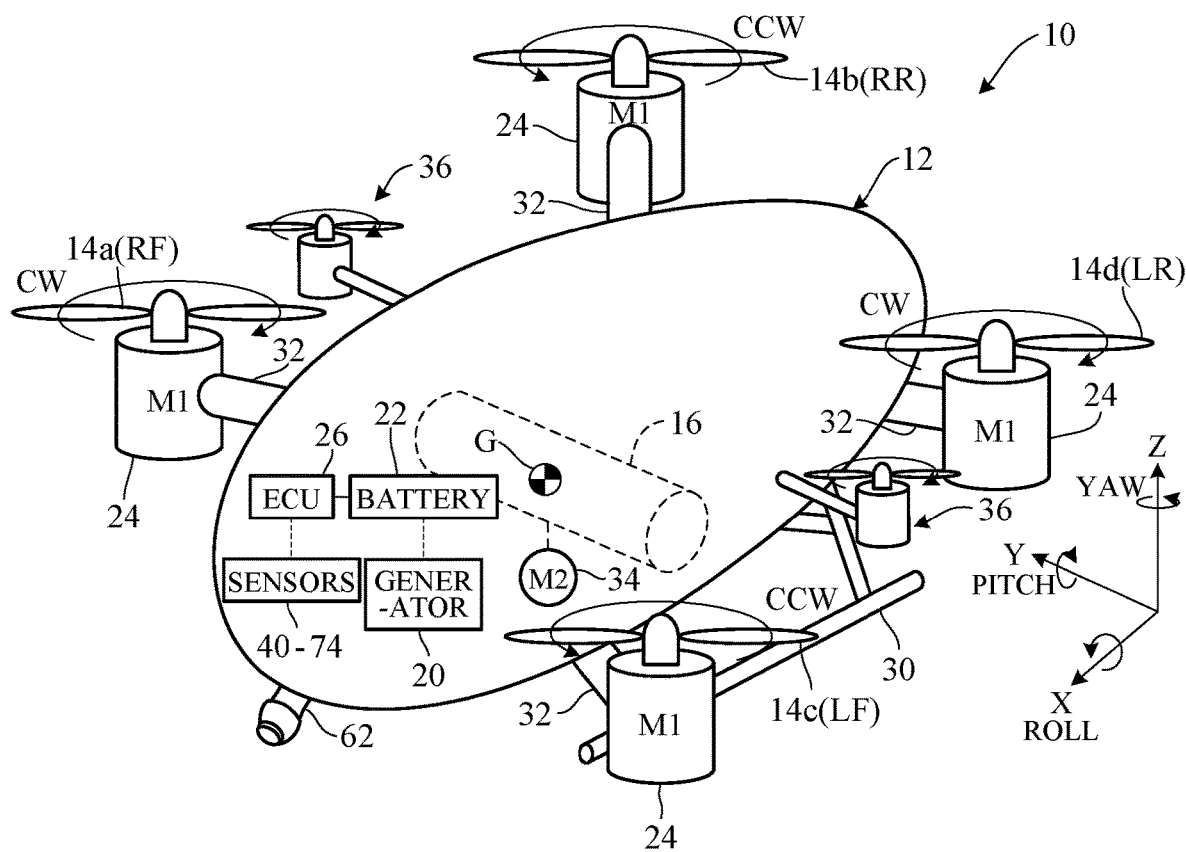
FIG. 13 is a perspective diagram, similar to FIG. 1, but showing an overall view of a hybrid flight vehicle according to a second embodiment of this invention.

FIG. 13 is a perspective diagram, similar to FIG. 1, but showing an overall view of a hybrid flight vehicle according to a second embodiment of this invention.

Turning to an explanation focused on points of difference from the first embodiment, the output shaft (turbine output shaft 16d1) of the GT 16 of the second embodiment is attached parallel to pitch axis (Y axis) of the frame 12. Namely, the output shaft of the GT 16 is attached similarly to in the example shown in FIG. 8B. Moreover, rotating shafts of the auxiliary rotors 36 are installed at the illustrated positions.

Figure 14:
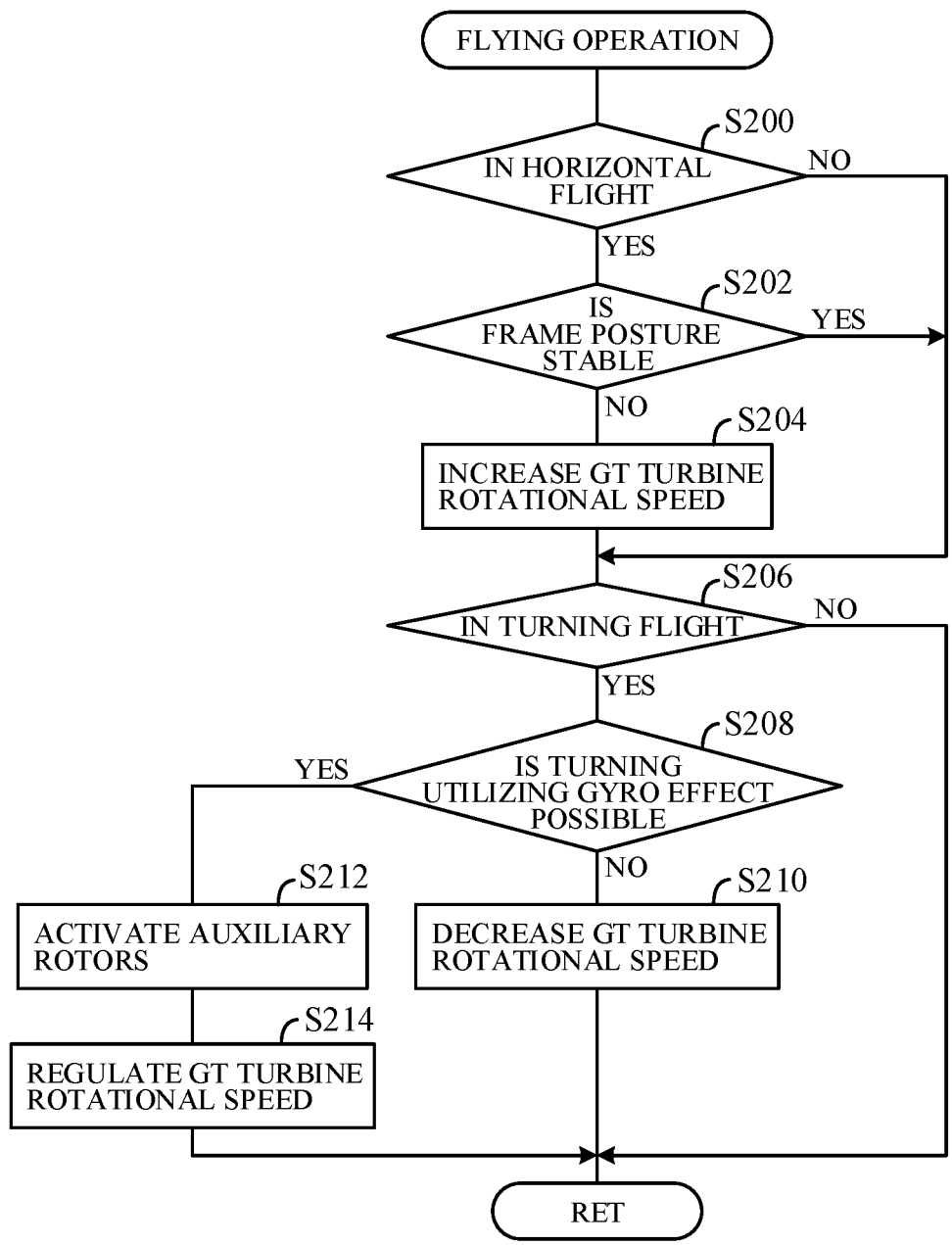
FIG. 14 is a flowchart, similar to that of FIG. 7, but showing processing operations by the control unit in the second embodiment.

FIG. 14 is a flowchart, similar to that of FIG. 7, but showing processing operations by the ECU 26 in the second embodiment.

Now to explain, it is determined in S200 whether in horizontal flight. When the result is YES, the program goes to S202, in which it is determined from output of the gyrosensor 56 whether posture of the frame 12 is stable. When the result in S202 is NO, the program goes to S204, in which turbine rotational speed N1 of the GT 16 is increased (raised) in order to use gyro effect of the GT 16 to help stabilize posture of the frame 12.

The program next proceeds to S206, in which it is determined from the flight mission read in S10 whether the flight vehicle 10 is in turning flight. The same applies when the result in S200 is NO or the result in S202 is YES.

When the result in S206 is YES, the program goes to S208, in which it is determined whether turning utilizing gyro effect is possible, and when the result is NO, goes to S210, in which turbine rotational speed N1 of the GT 16 is decreased (lowered) in order to decrease gyro effect of the GT 16 and thereby help stabilize posture during turning of the frame 12.

In other words, in light of the fact that attachment of the turbine output shaft 16d1 of the GT 16 parallel to pitch axis of the frame 12 increases horizontal stability, which is more harmful than helpful during turning of the flight vehicle 10, rotational speed N1 is decreased (lowered) in order to diminish horizontal stability and thereby achieve better postural stability during turning than when rotational speed N1 is high.

On the other hand, when the result in S208 is YES, i.e., when turning utilizing gyro effect is determined to be possible, the program goes to S212, in which the auxiliary rotors 36 are activated. Next, the program proceeds to S214, in which turbine rotational speed N1 is regulated in order to regulate gyro effect. In this case, since the auxiliary rotors 36 give rise to disturbance torque around roll axis (X axis), effective turning action is enabled by the resultant of such torque and gyro-moment around yaw axis.

As in the first embodiment, disturbance can be alternatively generated by driving the rotors 14 also in the second embodiment. Specifically, disturbance can be generated by controlling driving of the four rotors 14 so as to cause output difference (thrust difference) among the four rotors 14.

Returning to the flowchart of FIG. 5, the program next goes to S28, in which it is determined from output of the GPS receiver 60 whether a point above the destination has been reached, and when the result is NO, the program returns to S26, and when YES, goes to S30, in which the frame 12 (flight vehicle 10) goes into landing mode.

Owing to the aforesaid configuration, the second embodiment can utilize gyro effect of the GT 16 or gyro-moment to effectively stabilize posture during flight. Other effects and features are no different from those of the first embodiment.

Third Embodiment

Figure 15:
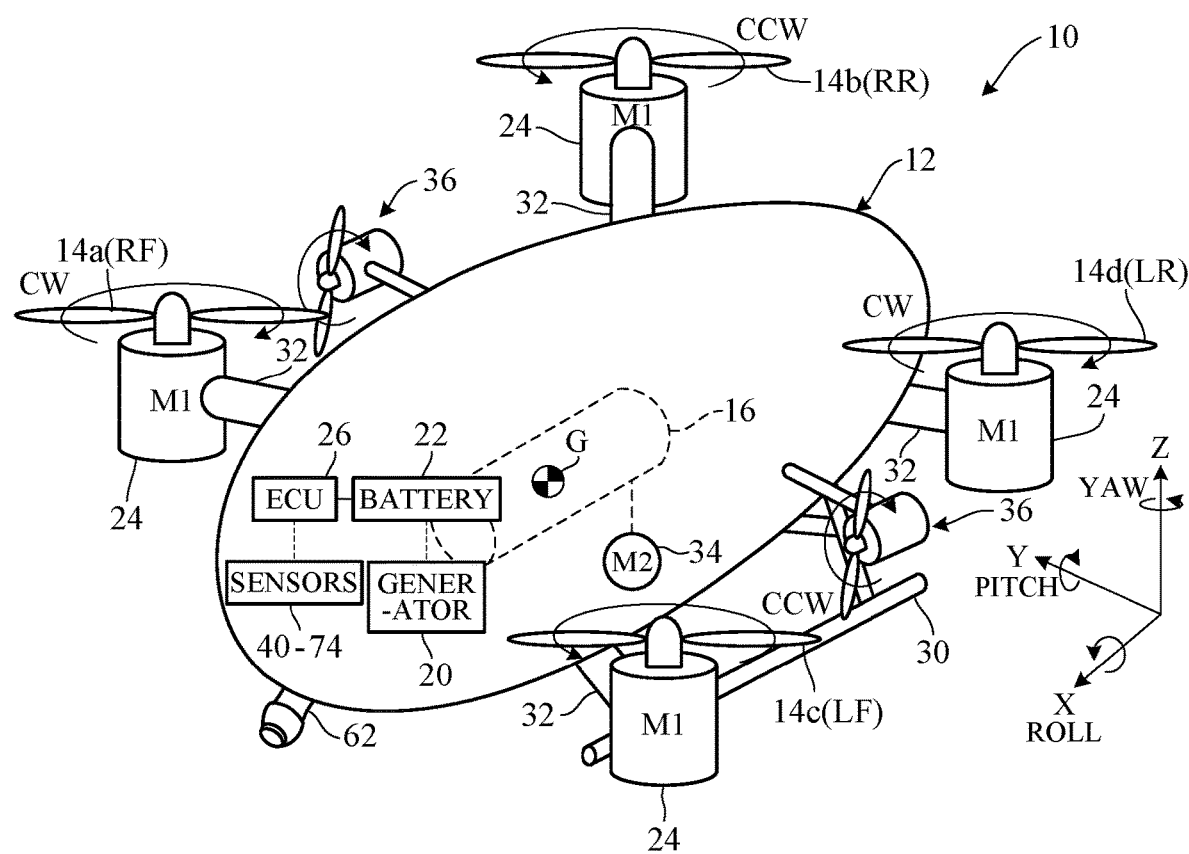
FIG. 15 is a perspective diagram, similar to FIG. 1, but showing an overall view of a hybrid flight vehicle according to a third embodiment of this invention.

FIG. 15 is a perspective diagram, similar to FIG. 1, but showing an overall view of a hybrid flight vehicle according to a third embodiment of this invention. Turning to an explanation focused on points of difference from the aforesaid embodiments, the output shaft (turbine output shaft 16d1) of the GT 16 of the third embodiment is attached parallel to roll axis (X axis) of the frame 12. Namely, the output shaft of the GT 16 is attached as shown in FIG. 8C. Moreover, rotating shafts of the auxiliary rotors 36 are installed at the illustrated positions.

Figure 16:
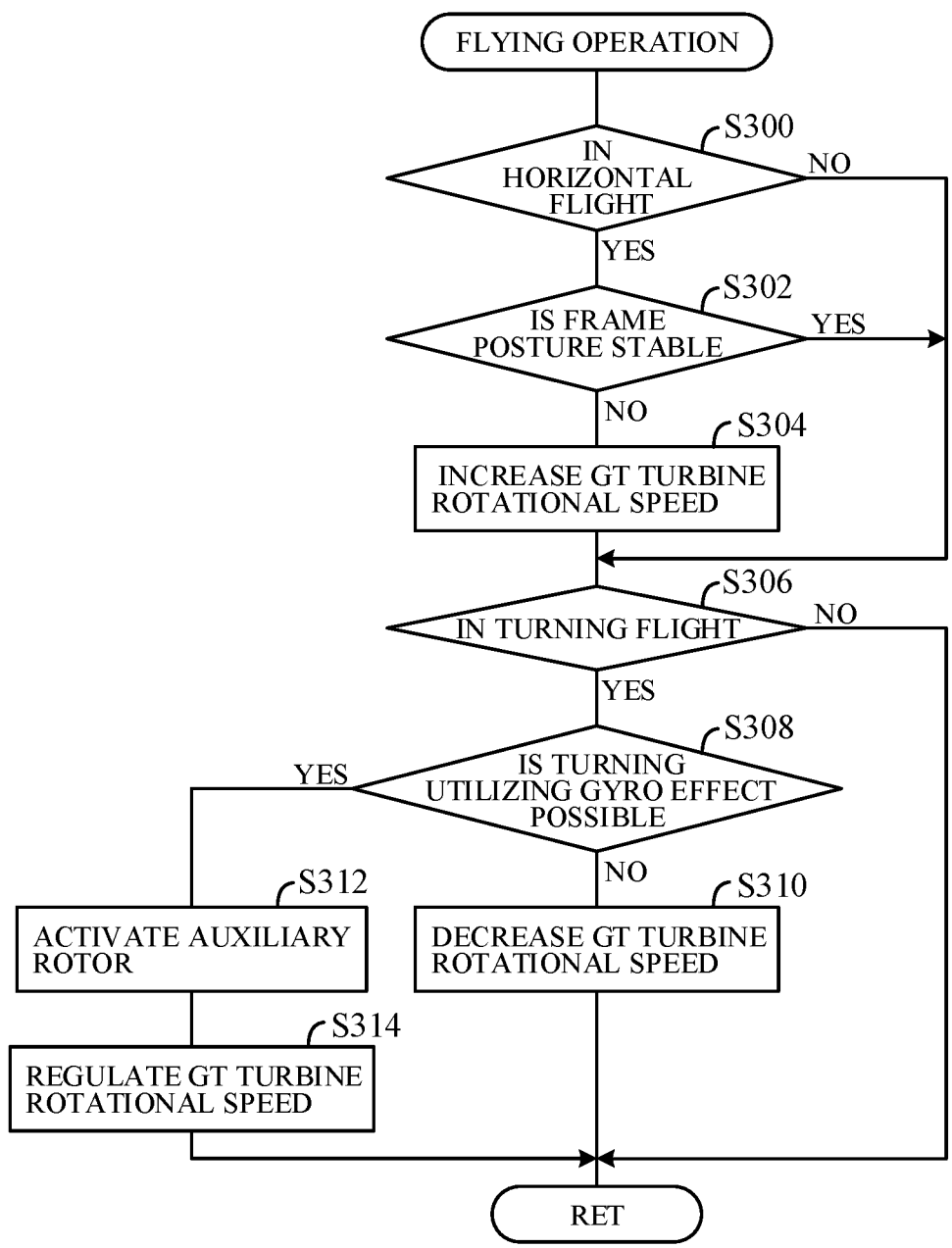
FIG. 16 is a flowchart, similar to that of FIG. 7, but showing processing operations by the control unit in the third embodiment.

FIG. 16 is a flowchart, similar to that of FIG. 7, but showing processing operations by the ECU 26 in the third embodiment.

Now to explain, it is determined in S300 whether in horizontal flight. When the result is YES, the program goes to S302, in which it is determined from output of the gyrosensor 56 whether posture of the frame 12 is stable. When the result in S302 is NO, the program goes to S304, in which turbine rotational speed N1 of the GT 16 is increased (raised) in order to use gyro effect of the GT 16 to help stabilize posture of the frame 12.

The program next proceeds to S306, in which it is determined from the flight mission read in S10 whether the flight vehicle 10 is in turning flight. The same applies when the result in S300 is NO or the result in S302 is YES.

When the result in S306 is YES, the program goes to S308, in which it is determined whether turning utilizing gyro effect is possible, and when the result is NO, goes to S310, in which turbine rotational speed N1 of the GT 16 is decreased (lowered) in order to decrease gyro effect of the GT 16 and thereby help stabilize posture during turning of the frame 12.

In other words, in light of the fact that attachment of the turbine output shaft 16d1 of the GT 16 parallel to roll axis of the frame 12 increases horizontal stability, which is more harmful than helpful during turning of the flight vehicle 10, rotational speed N1 is decreased (lowered) in order to diminish horizontal stability and thereby achieve better postural stability during turning than when rotational speed N1 is high.

On the other hand, when the result in S308 is YES, i.e., when turning utilizing gyro effect is determined to be possible, the program goes to S312, in which the auxiliary rotors 36 are activated. Next, the program goes to S314, in which turbine rotational speed N1 is regulated in order to regulate gyro effect. In this case, since the auxiliary rotors 36 give rise to disturbance torque around yaw axis (Z axis), effective turning action is enabled by the resultant of such torque and gyro-moment around pitch axis.

As illustrated in FIG. 15, the auxiliary rotors 36 of the third embodiment are installed at locations a predetermined distance apart from (sideways of) the frame 12 in pitch axis (Y axis) direction from center of gravity G of the frame 12, and axes of rotation of the blades 36b of the auxiliary rotors 36 are oriented parallel to roll axis (X axis).

The reason for this is that when the GT 16 is attached parallel to roll axis of the frame 12 as illustrated in FIG. 8C, and when input disturbance is torque around yaw axis, gyro-moment develops around pitch axis, thus enabling improvement of frame 12 turning performance by the resultant of these moments.

Returning to the flowchart of FIG. 5, the program next goes to S28, in which it is determined from output of the GPS receiver 60 whether a point above the destination has been reached and when the result is NO, the program returns to S26, and when YES, goes to S30, in which the frame 12 (flight vehicle 10) goes into landing mode.

Owing to the aforesaid configuration, the third embodiment can utilize gyro effect of the GT 16 or gyro-moment to effectively stabilize posture during flight. Other effects and features are no different from those of the first embodiment.

Fourth Embodiment

FIGS. 17A to 17C and FIG. 18 are schematic diagrams showing essentials of a hybrid flight vehicle GT 16 according to a fourth embodiment of this invention.

Turning to an explanation focused on points of difference from the aforesaid embodiments, the fourth embodiment comprises a switching mechanism 90 configured to switch attached (disposed) position of the output shaft of the GT 16 (turbine output shaft 16d1) between a position parallel to yaw axis (Z axis) of the frame 12, a position parallel to pitch axis (Y axis) of the frame 12, and a position parallel to roll axis (X axis) of the frame 12 through medium of the switching mechanism 90 in response to flight condition.

Now to explain, the switching mechanism 90 comprises a first gear 90b attached to a shaft 90a bridged between the GT 16 (more exactly, its casing (outer shell)) and a stationary part (wall or the like) 12e of the frame 12, a second (speed reducer) gear 90c engaged with and having fewer teeth than the first gear 90b, and an electric motor 90d attached to the second gear 90c. The shaft 90a is rotatably supported by a bearing 90e fitted in a recess formed in the stationary part 12e.

Figure 17A:
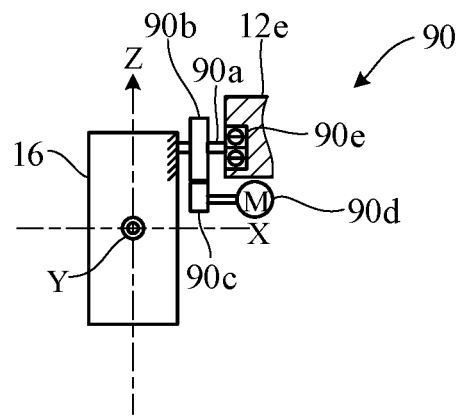
FIGS. 17A to 17C are a set of schematic diagrams showing essentials of a hybrid flight vehicle according to a fourth embodiment of this invention.
Figure 17B:
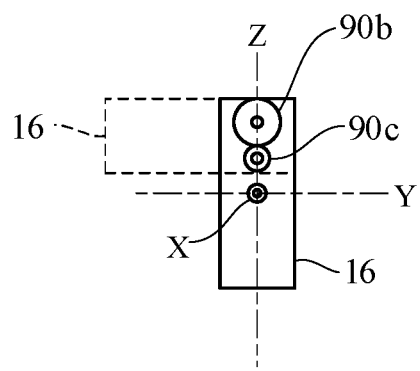
Figure 17C:
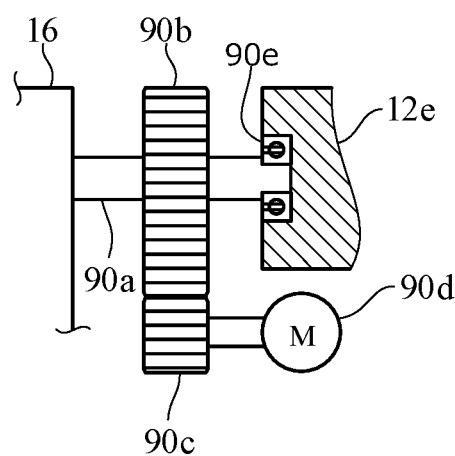

FIGS. 17A and 17B are explanatory diagrams showing the switching mechanism 90 as viewed, respectively, along pitch axis (Y axis) and as viewed along roll axis (X axis), and FIG. 17C is an enlarged view of vicinity of the first gear 90b of FIG. 17A.

Figure 18:
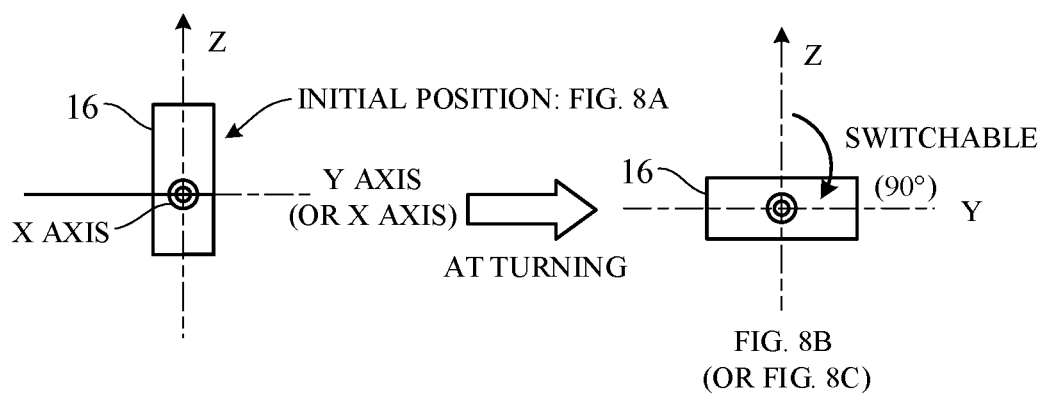
FIG. 18 are schematic diagrams showing essentials of a hybrid flight vehicle according to the fourth embodiment of this invention.

Initial (standard) position of the output shaft of the GT 16 is, as shown in FIG. 18, parallel to yaw axis (Z axis) of FIG. 8A, and the ECU 26 operates the switching mechanism 90 in response to flight condition in order to help stabilize turning flight posture by switching the output shaft of the GT 16 to a position parallel to pitch axis (Y axis) or roll axis (X axis) or to an arbitrary intermediate position therebetween.

Other structural features of the fourth embodiment are the same as those of the earlier embodiments. Therefore, although not illustrated, the fourth embodiment is similar to the foregoing embodiments in the aspect that when charge of the battery 22 reaches upper limit value, supply of fuel to the GT 16 is stopped and power is supplied from the battery 22 to the second motor 34 so as to motor the GT 16 by means of the second motor 34 and in the aspect that the frame 12 is equipped with the auxiliary rotors 36 for generating disturbance.

Owing to the aforesaid configuration, the fourth embodiment can utilize gyro effect of the GT 16 or gyro-moment to effectively stabilize posture during flight. Other effects and features are no different from those of the first embodiment.

As mentioned above, the first to fourth embodiments of this invention is configured to have a hybrid flight vehicle (10), comprising: a frame (12); multiple rotors (14) attached to the frame and configured to produce propelling force to propel the frame; a gas turbine engine (GT 16) attached to the frame and configured to be driven when fuel is supplied; a generator (20) connected to an output shaft (16$d$1) of the gas turbine engine and configured to generate electric power when driven by the gas turbine engine; a battery (22) configured to store the electrical power generated by the generator; multiple first electric motors (24) each connected to the rotors to drive associated one of the rotors when the electric power is supplied from the battery; and a control unit (electronic control unit (ECU)) 26 configured to control flight by regulating driving of the multiple rotors by the first electric motors; wherein the output shaft (16$d$1) of the gas turbine engine (GT 16) is attached parallel to at least one among yaw axis (Z axis), pitch axis (Y axis) and roll axis (X axis) of the frame (12). With this, it becomes possible to utilize gyro effect of the GT 16 or gyro-moment to effectively stabilize posture during flight.

More specifically, the first embodiment of this invention is configured to have a hybrid flight vehicle (10), comprising: a frame (12); multiple rotors (14) attached to the frame and configured to produce propelling force to propel the frame; a gas turbine engine (GT) (16) attached to the frame and configured to rotate when fuel is supplied; a generator (20) connected to an output shaft (16$d$1) of the gas turbine engine and configured to generate electric power when driven by the gas turbine engine; a battery (22) configured to store the electrical power generated by the generator; multiple first electric motors (24) each connected to the rotors to drive associated one of the rotors when the electric power is supplied from the battery; and a control unit (electronic control unit (ECU)) 26 configured to control flight by regulating driving of the multiple rotors by the first electric motors; wherein the output shaft (16$d$1) of the gas turbine engine (GT 16) is attached parallel to yaw axis (Z axis) of the frame (12). With this, it becomes possible to utilize gyro effect of the GT 16 or gyro-moment to effectively stabilize posture during flight.

The vehicle in the first embodiment is configured such that it further includes: a second electric motor (34) connected to the output shaft of the gas turbine engine (GT 16) to drive the gas turbine engine when the electric power is supplied from the battery (22); wherein the control unit (26) stops supply of fuel to the gas turbine engine and supplies electric power to the second electric motor (34) to motor the gas turbine engine when residual of the battery (22) is equal to or greater than a predetermined value (S20, S24 in FIG. 5). With this, in addition to the advantages and effects mentioned above, it becomes possible to utilize gyro effect or gyro-moment even when the GT 16 is stopped.

The vehicle in the first embodiment is configured such that, the control unit (26) increases turbine rotational speed (N1) of the gas turbine engine (GT 16) when the vehicle is in horizontal flight (S26 in FIG. 5; S102, S104 in FIG. 7). With this, in addition to the advantages and effects mentioned above, it becomes possible to achieve better postural stability in horizontal flight.

The vehicle in the first embodiment is configured such that the control unit (26) decreases turbine rotational speed N1 of the gas turbine engine (GT 16) when the vehicle is in turning flight (S26 in FIG. 5; S106-S110 in FIG. 7). With this, in addition to the advantages and effects mentioned above, it becomes possible to achieve better postural stability in turning flight.

The vehicle in the first embodiment is configured such that it further includes: an auxiliary rotor (36) attached to the frame (12) as a disturbance generator; wherein the control unit (26) activates the auxiliary rotor when the vehicle is in turning flight (S26 in FIG. 5; S106-S114 in FIG. 7). With this, in addition to the advantages and effects mentioned above, it becomes possible to achieve better postural stability in turning flight.

The vehicle in the first embodiment is configured such that the control unit (26) controls driving of the multiple rotors (14) so as to cause output difference among the multiple rotors when the vehicle is in turning flight (S26 in FIG. 5; S112$a$ in FIG. 11). With this, in addition to the advantages and effects mentioned above, it becomes possible to achieve better postural stability in turning flight.

The vehicle in the second embodiment is configured such that the output shaft (16$d$1) of the gas turbine engine (GT 16) is attached parallel to pitch axis of the frame (12), and it further includes: an auxiliary rotor (36) attached to the frame (12) as a disturbance generator; wherein the control unit (26) activates the auxiliary rotor in response to flight condition (S26 in FIG. 5; S206-S210 in FIG. 14). With this, it becomes possible to utilize gyro effect of the GT 16 or gyro-moment to effectively stabilize posture in turning flight.

The vehicle in the second embodiment is configured such that it further includes: a second electric motor (34) connected to the output shaft (16$d$1) of the gas turbine engine (GT 16) to drive the gas turbine engine when the electric power is supplied from the battery; wherein the control unit (26) stops supply of fuel to the gas turbine engine (GT 16) and supplies electric power to the second electric motor (34) to motor the gas turbine engine when residual of the battery (22) is equal to or greater than a predetermined value (S20, S24 in FIG. 5). With this, in addition to the advantages and effects mentioned above, it becomes possible to utilize gyro effect or gyro-moment even when the GT 16 is stopped.

The vehicle in the second embodiment is configured such that the control unit (26) activates the auxiliary rotor (36) when the vehicle is in turning flight. With this, in addition to the advantages and effects mentioned above, it becomes possible to achieve better postural stability in turning flight.

The vehicle in the third embodiment is configured such that the output shaft (16$d$1) of the gas turbine engine (GT 16) is attached parallel to roll axis of the frame, and it further includes: an auxiliary rotor (36) attached to the frame (12) as a disturbance generator; wherein the control unit (26) activates the auxiliary rotor (36) in response to flight condition (S26 in FIG. 5; S306-S310 in FIG. 14). With this, it becomes possible to utilize gyro effect of the GT 16 or gyro-moment to effectively stabilize posture in turning flight.

The vehicle in the third embodiment is configured such that it further includes: a second electric motor (34) connected to the output shaft (16$d$1) of the gas turbine engine (GT 16) to drive the gas turbine engine when the electric power supplied from the battery (22); wherein the control unit stops supply of fuel to the gas turbine engine and supplies electric power to the second electric motor (34) to motor the gas turbine engine when residual of the battery (22) is equal to or greater than a predetermined value (S20, S24 in FIG. 5). With this, in addition to the advantages and effects mentioned above, it becomes possible to utilize gyro effect or gyro-moment even when the GT 16 is stopped.

The vehicle in the third embodiment is configured such that the control unit (26) activates the auxiliary rotor (36) when the vehicle is in turning flight. With this, in addition to the advantages and effects mentioned above, it becomes possible to achieve better postural stability in turning flight.

The vehicle in the fourth embodiment is configured such that it further includes: a switching mechanism (90) configured to switch attached position of the output shaft (16d1) of the gas turbine engine (GT 16) between a position parallel to yaw axis of the frame, a position parallel to pitch axis of the frame, and a position parallel to roll axis of the frame, and wherein the control unit (26) switches attached position of the output shaft of the gas turbine engine by the swinging mechanism in response to flight condition. With this, it becomes possible to utilize gyro effect of the GT 16 or gyro-moment to effectively stabilize posture during flight.

The vehicle in the fourth embodiment is configured such that it further includes: a second electric motor (34) connected to the output shaft of the gas turbine engine (GT 16) to drive the gas turbine engine when the electric power is supplied from the battery (22); wherein the control unit (26) stops supply of fuel to the gas turbine engine and supplies electric power to the drive the second electric motor (34) to motor the gas turbine engine when residual of the battery is equal to or greater than a predetermined value (S20, S24 in FIG. 5). With this, in addition to the advantages and effects mentioned above, it becomes possible to utilize gyro effect or gyro-moment even when the GT 16 is stopped.

The vehicle in the fourth embodiment is configured such that it further includes: an auxiliary rotor (36) attached to the frame (12) and configured to generate disturbance generator; wherein the control unit activates the auxiliary rotor (36) in response to flight condition. With this, it becomes possible to utilize gyro effect of the GT 16 or gyro-moment to effectively stabilize posture during flight.

It should be noted in that above that any or all of the generator 20, first and second electric motors 24, 34 can be a motor generator.

While the present invention has been described with reference to the preferred embodiments thereof, it will be understood, by those skilled in the art, that various changes and modifications may be made without departing from the scope of the appended claims.

What is claimed is:

1. A hybrid flight vehicle, comprising:
a frame;
multiple rotors attached to the frame and configured to produce propelling force to propel the frame;
a gas turbine engine attached to the frame and configured to be driven when fuel is supplied;
a generator connected to an output shaft of the gas turbine engine and configured to generate electric power when driven by the gas turbine engine;
a battery configured to store the electrical power generated by the generator;
first electric motors each connected to a rotor of the multiple rotors to drive the rotor when the electric power is supplied from the battery; and
a control unit configured to control flight by regulating driving of the multiple rotors by the first electric motors;
wherein the output shaft of the gas turbine engine is attached parallel to a yaw axis, a pitch axis, or a roll axis of the frame;
wherein the control unit is configured to determine whether a posture of the frame is unstable during horizontal flight based on output from a gyrosensor, and to increase a turbine rotational speed of the gas turbine engine when the frame is unstable in the horizontal flight to stabilize the posture using engine gyro effect.

2. The vehicle according to claim 1, wherein the output shaft of the gas turbine engine is attached parallel to the yaw axis of the frame.

3. The vehicle according to claim 2, further including:
a second electric motor connected to the output shaft of the gas turbine engine to drive the gas turbine engine when the electric power is supplied from the battery;
wherein the control unit is configured to stop the gas turbine engine when a charge of the battery is equal to or greater than a predetermined value, and the second electric motor drives the gas turbine engine.

4. The vehicle according to claim 3, wherein
the gas turbine engine continues to be driven by the fuel when the charge of the battery is less than the predetermined value.

5. The vehicle according to claim 2, wherein the control unit is configured to decrease the turbine rotational speed of the gas turbine engine when the vehicle is in turning flight to decrease the engine gyro effect.

6. The vehicle according to claim 2, further including:
an auxiliary rotor attached to the frame;
wherein the control unit is configured to regulate the turbine rotational speed of the gas turbine engine when the vehicle is in turning flight using the engine gyro effect, and to activate the auxiliary rotor.

7. The vehicle according to claim 2, wherein the control unit is configured to control driving of the multiple rotors so as to cause output difference among the multiple rotors when the vehicle is in turning flight.

8. The vehicle according to claim 1, wherein the output shaft of the gas turbine engine is attached parallel to the pitch axis of the frame, and further including:
an auxiliary rotor attached to the frame;
wherein the control unit is configured to regulate the turbine rotational speed of the gas turbine engine when the vehicle is in turning flight using the engine gyro effect, and to activate the auxiliary rotor.

9. The vehicle according to claim 8, further including:
a second electric motor connected to the output shaft of the gas turbine engine to drive the gas turbine engine when the electric power is supplied from the battery;
wherein the second electric motor drives the gas turbine engine when a charge of the battery is equal to or greater than a predetermined value, and a supply of the fuel to the gas turbine engine is stopped
wherein the control unit is configured to stop the gas turbine engine when a charge of the battery is equal to or greater than a predetermined value, and the second electric motor drives the gas turbine engine.

10. The vehicle according to claim 9, wherein
the gas turbine engine continues to be driven by the fuel when the charge of the battery is less than the predetermined value.

11. The vehicle according to claim 1, wherein the output shaft of the gas turbine engine is attached parallel to the roll axis of the frame, and further including:
an auxiliary rotor attached to the frame;
wherein the control unit is configured to regulate the turbine rotational speed of the gas turbine engine when the vehicle is in turning flight using the engine gyro effect, and to activate the auxiliary rotor.

12. The vehicle according to claim 11, further including:
a second electric motor connected to the output shaft of the gas turbine engine to drive the gas turbine engine when the electric power supplied from the battery;
wherein the control unit is configured to stop the gas turbine engine when a charge of the battery is equal to or greater than a predetermined value, and the second electric motor drives the gas turbine engine.

13. The vehicle according to claim 12, wherein
the gas turbine engine continues to be driven by the fuel when the charge of the battery is less than the predetermined value.

* * * * *